United States Patent [19]
Mitchell et al.

[11] Patent Number: 4,482,271
[45] Date of Patent: Nov. 13, 1984

[54] BACKFILLING MATERIAL AND METHOD OF PREPARATION THEREOF

[75] Inventors: James K. Mitchell, Moraga; Tsung-chung Kao, Albany, both of Calif.

[73] Assignee: Regents of the University of California, Berkeley, Calif.

[21] Appl. No.: 25,942

[22] Filed: Apr. 2, 1979

Related U.S. Application Data

[62] Division of Ser. No. 846,918, Oct. 31, 1977, abandoned.

[51] Int. Cl.³ .............................................. H02G 9/02
[52] U.S. Cl. ...................................... 405/157; 174/98
[58] Field of Search .................... 405/154, 157, 264; 174/98

[56] References Cited

U.S. PATENT DOCUMENTS

| | | | |
|---|---|---|---|
| 2,774,383 | 12/1956 | Kidd | 405/157 X |
| 3,108,441 | 10/1963 | Watson | 405/264 |
| 3,227,572 | 1/1966 | Rundle et al. | 405/264 |
| 3,643,005 | 2/1972 | Mathews | 405/157 X |

FOREIGN PATENT DOCUMENTS 5875 of 1895 United Kingdom .................. 174/98

*Primary Examiner*—David H. Corbin
*Attorney, Agent, or Firm*—Flehr, Hohbach, Test, Albritton & Herbert

[57] ABSTRACT

A backfilling material and method of preparation for use with buried electrical cables. The material comprises a mixture of soil and wax in a proportion which achieves relatively low thermal resistivity to dissipate heat from the buried cable. In one embodiment the material is formed by mixing melted wax with soil. In another embodiment the material is formed by mixing soil with an emulsion of wax dispersed in an emulsifier. In another embodiment the material is formed by mixing soil with wax powdered to small particles. The mixture of soil and powdered wax is backfilled about the cable, heat from which causes self-curing as the wax melts in situ.

6 Claims, 3 Drawing Figures

BACKFILLING MATERIAL AND METHOD OF PREPARATION THEREOF

This is a division of application Ser. No. 846,918 filed Oct. 31, 1977, now abandoned.

BACKGROUND OF THE INVENTION

This invention relates in general to the backfilling of buried electrical cables, and in particular to backfilling materials for such applications.

There is a requirement to dissipate heat from buried electrical power transmission cables. Where a backfill material of relatively poor thermal conductivity is employed heat will build up on the cable to the extent that the insulation may break down and cause hot spots. Eventually the cable must be repaired or replaced, which is expensive, time consuming and results in a break in power operation.

Heretofore the thermal conductivity limitation of conventional backfill material has required power transmission systems to be designed with the upper limit of cable temperature at about 60° C. New cable systems are being proposed for operation at temperatures as high as 90° C. It would be desirable to provide a backfill material which would achieve both high heat conduction and durability so that the systems could be designed to withstand both high cable temperatures and current loadings to afford higher and more economical power transmission capabilities.

It is known that some moist, tamped sand and gravel backfills can have a relatively low thermal resistivity ($\rho$). For example, test of some soil samples having an average water content of 6% have exhibited a value of $\rho$ as low as 50° C.-cm/watt. However, in many cases the heat from the buried cable causes these backfills to dry with the value of $\rho$ increasing substantially so that the properties of good thermal conduction are lost. Many soils encountered along the route of a buried cable exhibit unacceptably high values of thermal resistivity regardless of water content.

A number of soil additives have been investigated in an attempt to resolve the foregoing problems. Among these additives are (1) an insoluble silica gel comprised of calcium chloride and sodium silicate, (2) a cement-based compound having the trade designation C-7, developed originally for dredged material stabilization, (3) a cement-based compound having the trade designation Chemicolime, a material developed for soft soil stabilization, (4) Portland cement, (5) cement-bentonite mixture.

Backfill test of the described additives show that they could not effect a significant reduction in thermal resistivity as compared to untreated soil in a moist state, although they exhibited relatively good thermal resistivity properties in comparison to untreated soil after drying. Such additives possessed other limitations and disadvantages, such as relatively high cost or, in the case of Portland cement and C-7, hardening of the backfill which would render the buried cables less accessible for servicing or replacement.

OBJECTS AND SUMMARY OF THE INVENTION

It is a general object of the invention to provide a new and improved method for achieving optimum conduction of thermal energy away from buried electrical transmission cables.

Another object is to provide a backfill material for buried electrical cable in which the material has low thermal resistivity, is inexpensive, which does not harden around the cable, and which does not deteriorate with time and exposure.

Another object is to provide a method of preparing a backfill material of relatively low thermal resistivity for use with buried electrical cables.

The invention in summary provides a backfill material comprised of a mixture of soil and wax in an amount of at least 2 percent by weight. In one embodiment the soil is mixed with melted wax, placed in a trench about the cable and then compacted. In another embodiment the soil is mixed with an emulsion of wax dispersed in an emulsifier with the mixture then placed and compacted about the cable. In another embodiment a mixture of soil and powdered wax is placed and compacted about the cable, with heat from the cable subsequently melting the wax to self-cure the backfill.

The foregoing and additional features and objects of the invention will appear from the following description in which the several embodiments have been set forth in detail in conjunction with the accompanying drawings.

DESCRIPTION OF THE PREFERRED EMBODIMENTS

The present invention provides a backfill material and method for burying electrical cables such as power transmission cables in a substrate such as the earth. Typically for a single case a trench two feet in width and four feet in depth is dug in a path along the earth with electrical cable of 8 inches or more in diameter to be buried in the trench at a depth of three feet, for example.

One embodiment of the invention provides a "hot mix" backfill material and method of preparation thereof which when filled in the trench about the cable provides for optimum conduction of thermal energy from the cable. The method of burying the cable by the material of this embodiment is illustrated in the schematic of FIG. 1.

Figure 1:
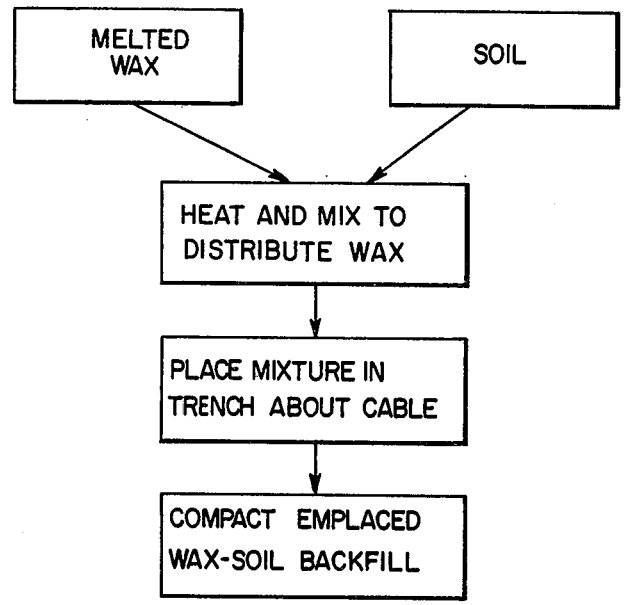
FIG. 1 is a schematic block diagram illustrating the method steps of one embodiment of the invention.

In the embodiment of FIG. 1 a soil is mixed with melted wax. As used herein the word soil encompasses all types of gravel, clay, silt and sands of the nature typically employed for backfilling of trenches. The wax is selected from the group consisting of crystalline waxes, microcrystalline waxes, and slack waxes. An example of the crystalline wax would be CD or a paraffin wax such as sold under the trade designation CD 150/160 by the Polygon Wax Manufacturing Company. Microcrystalline waxes are highly refined, high melting point crystalline waxes. Slack waxes are byproducts of lubricant oil refining.

The soil and one of the described waxes, or combinations of such waxes, are mixed in a suitable heated container or vessel with the wax comprising at least about 2 percent by weight of the dry soil. The container is heated by suitable means such as gas burners to above the melting point of the wax, e.g. to a temperature of 155° F. where CD 150/160 is employed as the wax. In the next step the heated mixture is placed along the trench about the cable. The emplaced backfill material is then compacted by suitable means such as tampers or vibrators to the highest density practicable. The compaction achieves close packing of the backfill for enhancing interparticle contact. Following compaction, the backfilled trench may be covered by means such as a pavement layer.

Table I lists four backfill mixtures which illustrate examples of the use of the first embodiment of the invention. Mixture A comprises a mixture of 3% by weight CD 150/160 wax and Fire Valley thermal sand and limestone gravel, which was heated to a temperature of 155° F. and then compacted to a density of 125 pcf.

Mixture B comprises a mixture of 3% by weight of paraffin and Fire Valley thermal sand which was heated to a temperature of 128° F. and then compacted.

Mixture C comprises a mixture of 3% by weight microcrystalline wax and Fire Valley thermal sand and heated to a temperature of 165° F. and then compacted.

Mixture D comprises a mixture of 3% by weight slack wax and Fire Valley thermal sand heated to a temperature of 150° F. and then compacted.

The thermal resistivities ($\rho$) of the four samples were then measured. Table I shows that the thermal resistivity values compare favorably to the thermal resistivity of untreated moist compacted soil and are much lower than the thermal resistivity of the dry soil.

Table II lists mixtures of two other dry sands which further illustrate the beneficial effect of wax in reducing the thermal resistivity.

Figure 2:
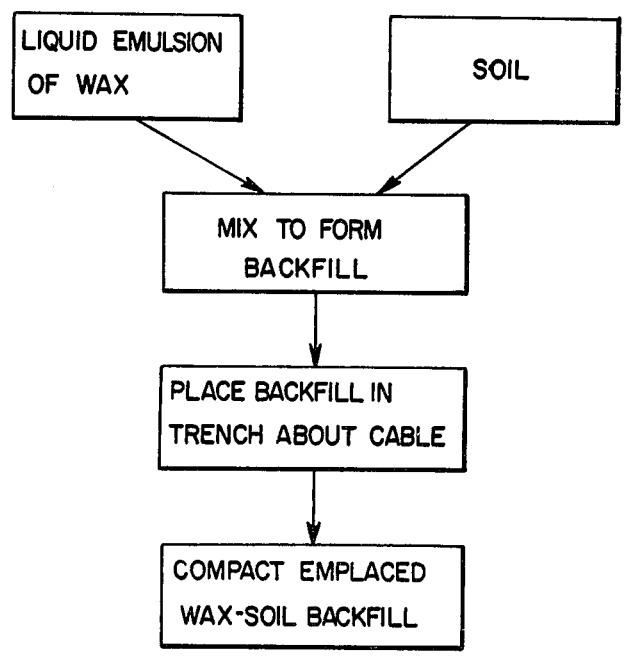
FIG. 2 is a block diagram illustrating the method steps of another embodiment.

FIG. 2 illustrates the method of burying a cable with backfill material formed in another embodiment of the invention. In the first step an emulsion is prepared of one of the previously-described waxes with a suitable liquid (usually water) and a suitable emulsifying agent. The emulsion can be prepared in the proportions of 50% wax and 50% emulsifier or other proportions as desired. As an example, an emulsion suitable for this purpose is Slack Wax Emulsion L sold by the Chevron Research Company. The emulsion is then mixed with soil to form a backfill with the wax comprising at least about 2% by weight. The mixture is then poured or otherwise placed along the trench about the cable and compacted. The emplaced backfill can then dry out over a period of time leaving the wax precipitated at interparticle contacts to achieve good thermal conduction. Table III illustrates the use of the second embodiment of the invention on the Fire Valley thermal sand.

Figure 3:
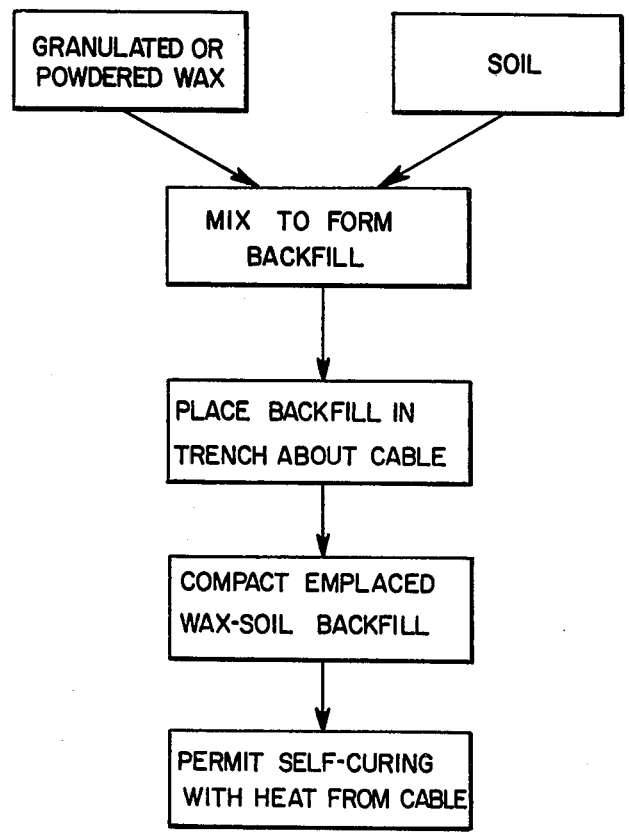
FIG. 3 is a block diagram illustrating the method steps of yet another embodiment.

FIG. 3 illustrates a method of burying a cable with backfill material formed in accordance with another embodiment of the invention. In the first step of this embodiment one of the previously-described waxes is sub-divided (granulated or powdered) into small particles and then mixed with soil, with the wax comprising at least about 2% by weight of the mixture. The mixture is then poured or otherwise placed along the trench about the cable and compacted. When in use, heat from the cable will conduct through the backfill and raise the temperature of the wax above its melting point. The fused wax in combination with the soil provides a backfill having relatively low thermal resistivity.

Table IV illustrates the use of the third embodiment of the invention on the Fire Valley thermal sand.

While the foregoing embodiments are at present considered to be preferred, it is understood that numerous variations and modifications may be made therein by those skilled in the art and it is intended to cover in the appended claims fall within the true spirit and scope of the invention.

TABLE I

| Mixture | Wax | % Wax of Mixture by Weight of Dry Soil | Thermal Resistivity, $\rho$ (cm-°C./watt) | Dry Density $\gamma_d$(pcf) | Melting Point of Wax |
| --- | --- | --- | --- | --- | --- |
| A | CD 150/160 | 3% | 52 | 125 | 155° F. |
| B | Paraffin | 3% | 52 | 125 | 128° F. |
| C | Microcrystalline | 3% | 60 | 125 | 165° F. |
| D | Slack wax | 3% | 60 | 125 | ≈150° F. |
| Untreated dry sand | — | — | 90 | 125 | |
| Untreated moist sand (6% water content) | — | — | 50 | 125 | |

TABLE II

| Sand | % of Slack Wax | $\rho$ (°C.-cm/watt) | Density (pcf) |
| --- | --- | --- | --- |
| Monterey #0 | 0% | 300 | 110 |
| Monterey #0 | 3% | 100 | 110 |
| Monterey #0 | 6% | 80 | 110 |
| Round-Robin Sand | 0% | 78 | 135 |
| Round-Robin Sand | 3% | 35 | 135 |
| Round-Robin Sand | 6% | 32 | 135 |

TABLE III

| Sand | % of Emulsified Wax | $\rho$ (°C.-cm/watt) | Density (pcf) |
| --- | --- | --- | --- |
| Fire Valley thermal sand | 0% | 100 | 120 |
| Fire Valley thermal sand | 6% | 62 | 120 |

TABLE IV

| Sand | % of Granulated or Powdered Wax | $\rho$ (°C.-cm/watt) | Density (pcf) |
| --- | --- | --- | --- |
| Fire Valley thermal sand | 0% | 100 | 120 |
| Fire Valley thermal sand | 6% | 68 (after heating) | 120 |

What is claimed is:

1. A method of treating the backfill in a trench around an electrical transmission cable buried in a substrate such as the earth for optimum conduction of thermal energy from the cable, including the steps of digging a trench in the substrate, placing the cable within the trench, and emplacing compacted mixture of soil and wax about the cable within the trench, said wax comprising at least about 2% by weight of the mixture.

2. A method as in claim 1 in which the wax is selected from the group consisting of crystalline petroleum wax, microcrystalline petroleum wax, and slack wax.

3. A method as in claim 1 in which the mixture of soil and wax is deposited about the cable, including the step of compacting the deposited mixture about the cable.

4. A method as in claim 1 in which the mixture is heated to a temperature to cause the wax to melt.

5. A method as in claim 1 in which the mixture is formed by preparing an emulsion of wax dispersed in an emulsifier, and soil is mixed with the emulsion.

6. A method as in claim 1 in which the mixture is formed by mixing soil with granulated or powdered wax.

* * * * *